(12) United States Patent
Schell et al.

(10) Patent No.: US 8,823,539 B2
(45) Date of Patent: Sep. 2, 2014

(54) METHOD OF DISPLAYING MULTI-FIBER TEST RESULTS

(75) Inventors: J. David Schell, Austin, TX (US); Sena E. R. Janky, Sammamish, WA (US)

(73) Assignee: Fluke Corporation, Everett, WA (US)

( * ) Notice: Subject to any disclaimer, the term of this patent is extended or adjusted under 35 U.S.C. 154(b) by 166 days.

(21) Appl. No.: 13/362,509

(22) Filed: Jan. 31, 2012

(65) Prior Publication Data
US 2013/0194103 A1     Aug. 1, 2013

(51) Int. Cl.
*G08B 5/00*     (2006.01)
(52) U.S. Cl.
USPC .............. 340/815.4; 398/34; 398/35; 398/79; 702/67; 702/76; 702/108; 702/120; 702/121; 702/186; 702/189; 345/440.1; 345/440.2; 385/13; 385/16
(58) Field of Classification Search
CPC .................. H04J 14/0227; H04J 14/02; H04B 10/07955; G01R 31/31701; G01R 31/31907; G01D 5/353; G02B 6/3604; G02B 6/293
USPC ........ 340/815.4; 398/34, 35, 79; 702/76, 108, 702/120, 121, 186, 189, 67; 345/440.1; 385/13, 16, 25, 26, 36
See application file for complete search history.

(56) References Cited

U.S. PATENT DOCUMENTS

| | | | |
|---|---|---|---|
| 4,996,654 A | | 2/1991 | Rosenow |
| 5,291,285 A | * | 3/1994 | Yokoyama et al. ............ 348/180 |
| 5,462,438 A | | 10/1995 | Becker et al. |
| 5,521,701 A | * | 5/1996 | Felger et al. ................... 356/218 |
| 5,825,516 A | * | 10/1998 | Walsh ............................... 398/40 |
| 6,208,944 B1 | * | 3/2001 | Franke et al. .................... 702/56 |
| 6,941,079 B1 | * | 9/2005 | Barozzi et al. ................. 398/157 |
| 7,020,096 B2 | * | 3/2006 | Kurihara et al. ............... 370/252 |
| 7,260,489 B2 | | 8/2007 | Yao et al. |
| 7,642,911 B2 | * | 1/2010 | Desrosiers et al. ......... 340/539.1 |
| RE41,130 E | * | 2/2010 | Fette et al. ....................... 455/91 |
| 7,667,720 B2 | * | 2/2010 | Kimura .......................... 345/690 |
| 7,675,880 B2 | * | 3/2010 | Kim ............................... 370/318 |
| 7,692,203 B2 | * | 4/2010 | Konno et al. .................... 257/96 |
| 7,694,230 B2 | * | 4/2010 | Terada ........................... 715/771 |
| 8,004,527 B2 | * | 8/2011 | Culpi et al. ................ 345/440.2 |
| 8,170,543 B1 | * | 5/2012 | Shah .............................. 455/423 |
| 8,194,076 B2 | * | 6/2012 | Culpi et al. ................ 345/440.2 |
| 8,548,760 B2 | * | 10/2013 | Chappell ......................... 702/58 |
| 8,743,120 B2 | * | 6/2014 | Aiso .............................. 345/440 |
| 2004/0208435 A1 | * | 10/2004 | Moore ............................. 385/25 |
| 2007/0176933 A1 | * | 8/2007 | Culpi et al. ................ 345/440.2 |
| 2010/0194985 A1 | * | 8/2010 | Unger et al. ................... 348/570 |
| 2010/0313668 A1 | * | 12/2010 | Tao et al. ........................ 73/800 |
| 2011/0218754 A1 | * | 9/2011 | Mori .............................. 702/108 |
| 2012/0288233 A1 | * | 11/2012 | Barnes et al. .................... 385/59 |
| 2012/0314209 A1 | * | 12/2012 | Doddridge .................. 356/73.1 |

OTHER PUBLICATIONS

Fluke Networks—2009 Fluke Corporation.*
White Paper—2007 Fluke Corporation.*

* cited by examiner

*Primary Examiner* — Benjamin C Lee
*Assistant Examiner* — Quang D Pham
(74) *Attorney, Agent, or Firm* — Edwards Wildman Palmer LLP; Scott D. Wofsy; Christopher J. Capelli

(57) ABSTRACT

A display method and apparatus provides an easy to interpret presentation of multiple channel data, in the form of columns where the height of the column represents the relative measurement. A threshold line provides an indication of whether the measurement is above or below the threshold. Greater detail and numeric measurement values can be displayed for individual channels while the multiple channel display is in view.

9 Claims, 4 Drawing Sheets

METHOD OF DISPLAYING MULTI-FIBER TEST RESULTS

BACKGROUND OF THE INVENTION

This disclosure relates to test and measurement, and more particularly to a method and apparatus for displaying test results from multiple test inputs.

When making test measurements on multiple channels or multiple inputs, especially when such measurements are of similar variables or signals, it can be desirable to display the various measurement results together, for comparison or the like. In accordance with the prior art, as shown in FIG. 5, a graphical representation of signals is shown, together with an alternate viewing mode of a chart showing channel data in FIG. 6. A problem with this method is that it is difficult for the user to quickly evaluate one channel relative to another. It is also difficult to quickly evaluate each displayed number relative to some threshold of quality (a limit).

SUMMARY OF THE INVENTION

In accordance with the invention, an improved display method and device is provided for displaying data from multiple channels.

Accordingly, it is an object of the present disclosure to provide an improved multiple channel display method.

It is a further object of the present disclosure to provide an improved multiple channel display device.

It is yet another object of the present disclosure to provide an improved multiple channel display that allows easy comparison of multiple channels to one another as well as to a threshold value.

The subject matter of the present display method and apparatus is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present disclosure comprises a method and apparatus for displaying multiple channel data.

The method and apparatus provides an easy to interpret and quickly view the information from measurements on multiple measurement channels. The presentation of information quickly allows the user to determine qualitative goodness relative to a settable limit. It also allows the user to examine quantitative information quickly through selectable channel information. The information for all channels is presented simultaneously in a graphical format allow the user to easily understand and interpret the results from all channels simultaneously. The method and apparatus allow for the use of low cost fixed segment LCDs as well as high-resolution dot matrix displays.

Figure 1:
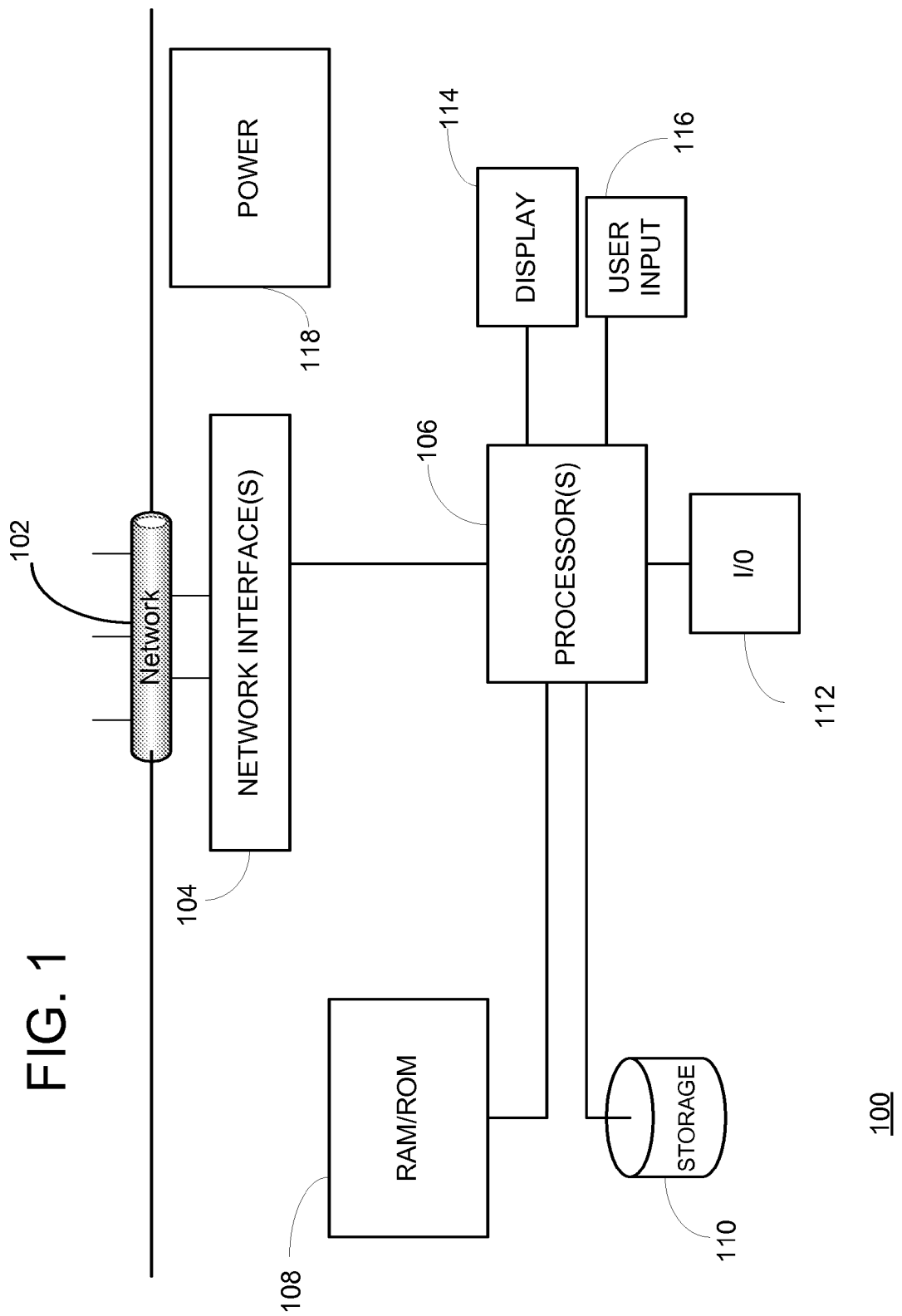
FIG. 1 is a block diagram of a test instrument that embodies the display method and apparatus.

Referring now to FIG. 1, a block diagram of a test instrument, in this particular embodiment, an optical networking test instrument 100, the instrument connects to a network under test 102, an optical network in a particular embodiment, via network interface(s) 104. The instrument includes processor(s) 106, memory such as RAM/ROM 108, persistent storage 110, I/O 112 which attaches the device to a network or other external devices (storage, other computer, etc.), display 114, user input devices 116 (such as, for example, keyboard, mouse or other pointing devices, touch screen, etc.), power supply 118 which may include battery or AC power supplies. The processor(s) operate the instrument to provide test and measurement function for the network.

In operation, the network test instrument is attached to the network, and observes transmissions on the network and provides stimulus and response measurement to collect information and statistics and effect testing and measurement.

Figure 2:
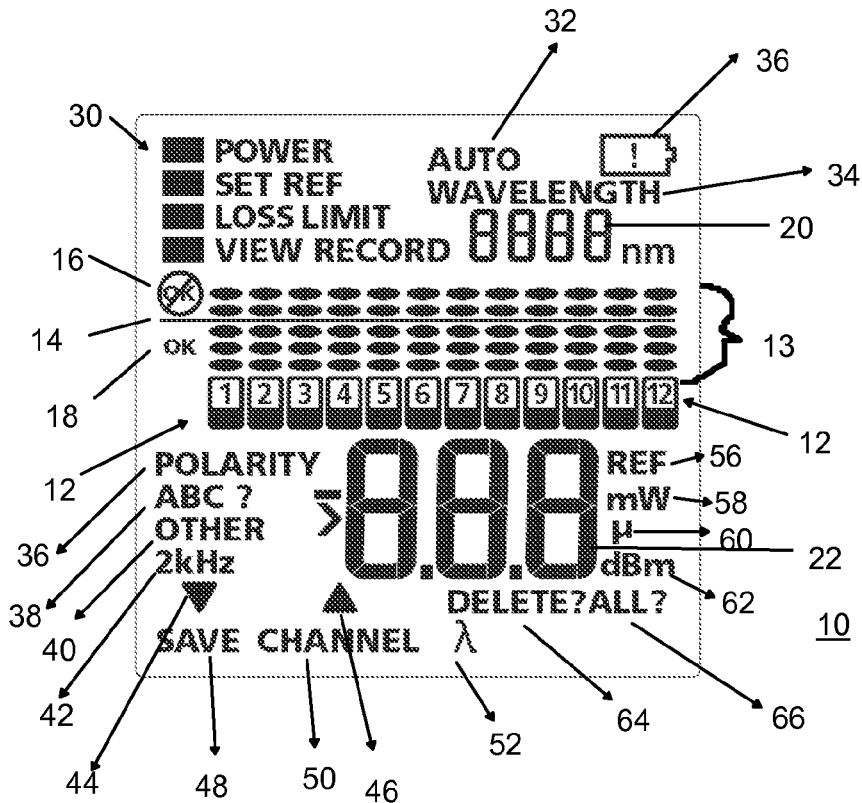
FIG. 2 is a view of a particular display in accordance with the method and apparatus.

Referring now to FIG. 2, an exemplary display 10 in accordance with the method and apparatus, plural channel indicators 12 are provided (twelve such channels shown in the illustrated embodiment), wherein a graphical indicator with channel number indication represents the individual channels. Above each channel are plural vertically aligned ovals in region 13, 5 such ovals per channel in the illustrated version. Between the $3^{rd}$ and $4^{th}$ ovals is a horizontal threshold line 14, resulting in 3 ovals below and two ovals above the threshold line. Further provided on a left side of the screen, above and below the threshold line 14 are a not-ok indicator 16 and an ok indicator 18. Wavelength display digits 20 are provided in an upper right position of the screen, while signal level display digits 22 are positioned in a lower right portion of the screen.

Figure 3:
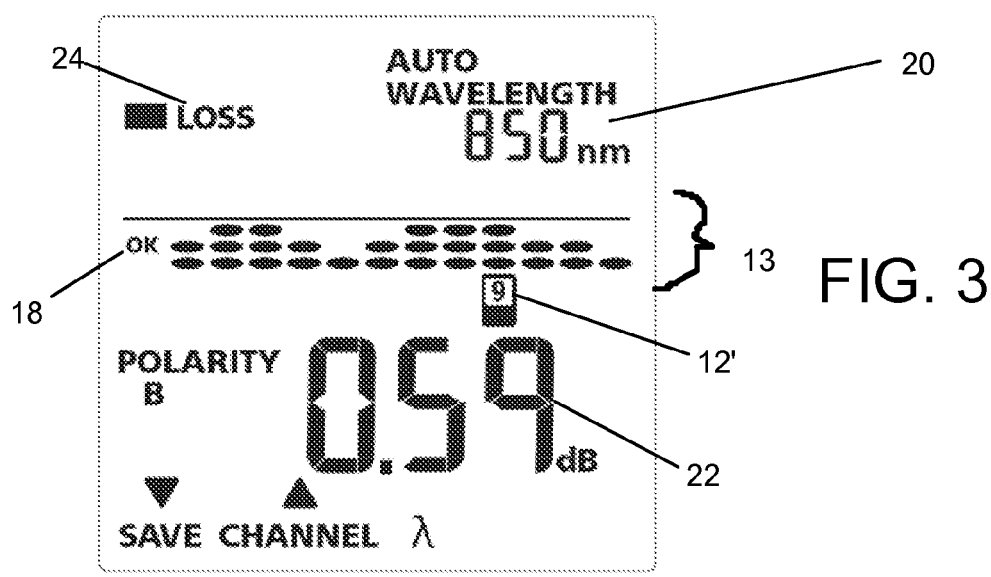
FIG. 3 is a view of a particular display illustrating all measurements being below a threshold.

Referring now to FIG. 3, an operational view is provided for a measurement situation where all measured values are below the threshold limit. In the particular view, specific measurement values are shown for channel 9, so the graphical channel indicator 12' is displayed for channel 9. The relative values of the other channels are displayed in region 13. In signal level display area 22, a signal level value of 0.59 db is shown, while in wavelength display area 20, a value of 850 nm is shown. A loss indicator 24 is illuminated to show that the particular measurement being displayed is signal loss. OK indicator 18 is illuminated, demonstrating that all the signal channel values are below the threshold.

Figure 4:
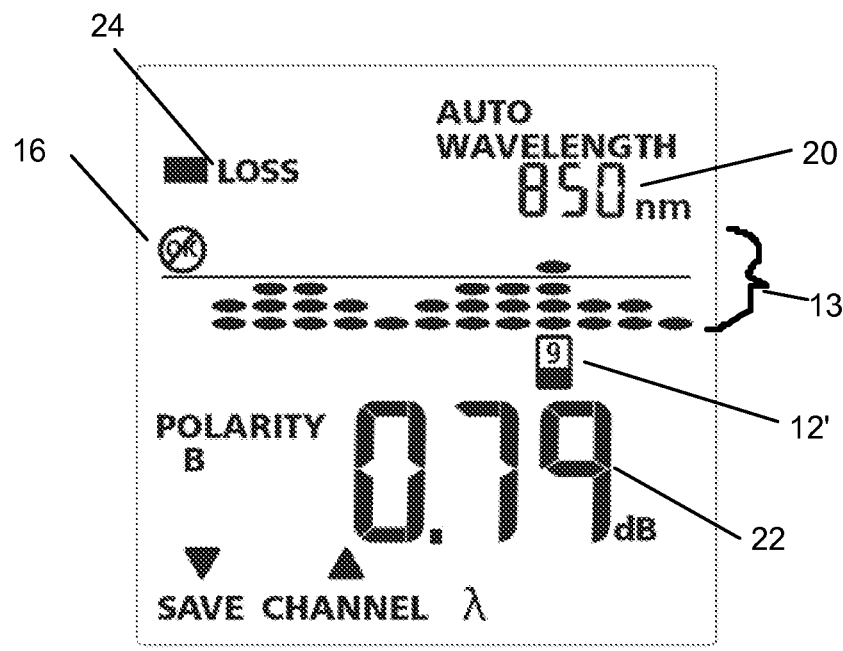
FIG. 4 is view of a particular display illustrating a measurements being above a threshold.
Figures 5, 6:
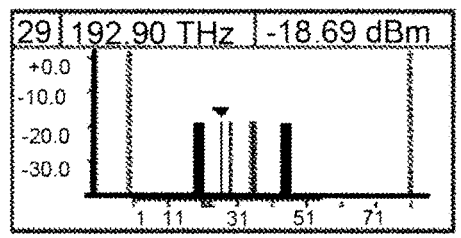
FIG. 5 is a view of a prior art display.
FIG. 6 is a view of another prior art display.

FIG. 4 is an illustration of an example display of particular data in a case where at least one channel's data is outside of the threshold as represented by threshold line 14. In FIG. 4, oval 26 is illuminated for channel 9, where oval 26 is above the threshold line 14, indicating that the measurement value is beyond the threshold. As a result, the not OK indicator 16 is made visible (as contrasted with the situation of FIG. 3, where OK indicator 18 was visible), conveying that a value is out of acceptable range. The particular measurement value (0.79 db) is displayed at 22.

Referring again to FIG. 2, this figure illustrates an embodiment of an exemplary display with many of the possible display elements illustrated, including measurement type being performed 30 (POWER, SET REF, LOSS LIMIT, VIEW RECORD), mode indicator 32 (AUTO), measurement type indicator 34 (WAVELENGTH), low battery indicator 36, channel indicators 12, plural ovals (in the illustrated embodiment) 13, POLARITY 36, ABC? 38 (all separately displayable), OTHER indicator 40, 2 kHz indicator 42, up arrow 44, down arrow 46, SAVE 48, CHANNEL 50, λ 52, plus or minus indicator 54, display digits 22. Other display elements include REF 56, mW 58, μ 60, dBm 62, DELETE? 64, ALL? 66.

In operation, the various elements are displayed that correspond to the particular type of measurement or operation being performed.

Accordingly, an improved display and method is provided that enables easy comparison of multiple channel data as well as quick understanding of where a measurement value falls in relation to a threshold value.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for displaying multiple fiber optic channel data in an optical network test instrument configured to perform a plurality of measurements, the method comprising:
   presenting on a display plural channel information on characteristics of a plurality of fiber optic channels corresponding to a plurality of optical fibers simultaneously in a graphical form, the presented plural channel information corresponding to a particular measurement being performed across the plurality of fiber optic channels corresponding to the plurality of optical fibers;
   presenting on the display a threshold indicator in relation to the presented plural channel information, wherein the threshold indicator comprises a graphical representation of a limit corresponding to the particular measurement being performed across the plurality of fiber optic channels; and
   simultaneously presenting on the display further detail information for at least one fiber optic channel among the plurality of fiber optic channels, wherein said detail information is selected based on the particular measurement being performed.

2. The method of displaying multiple channel data according to claim 1, wherein the threshold indicator comprises the graphical representation of the limit displayed relative to the plural channel information.

3. The method of displaying multiple channel data according to claim 1, wherein said presenting plural channel information simultaneously in a graphical form comprises displaying plural columns of indicators representing a relative signal value on each of the plurality of fiber optic channels.

4. The method of displaying multiple channel data according to claim 1, wherein the detail information further comprises a measurement type indicator and mode indicator and polarity indicator.

5. A multiple channel data display device for use in an optical network having a plurality of fiber optic channels, wherein the multiple channel data display device is configured to perform a plurality of measurements, the device comprising:
   plural channel information display elements for showing multiple channel data on characteristics of the plurality of fiber optic channels corresponding to a plurality of optical fibers simultaneously in a graphical form, the presented plural channel information corresponding to a particular measurement being performed across the plurality of fiber optic channels corresponding to the plurality of optical fibers; and
   further detail information display elements for simultaneously displaying further detailed information for at least one fiber optic channel among the plurality of fiber optic channels, wherein said detail information is selected based on the particular measurement being performed, said detail information comprising at least a measurement type indicator and mode indicator;
   wherein said plural channel information display element further comprising displaying a threshold indicator in relation to the shown multiple channel data, wherein the threshold indicator comprises a graphical representation of a limit corresponding to the particular measurement being performed across the plurality of fiber optic channels.

6. The multiple channel data display device according to claim 5, wherein the threshold indicator comprises said graphical representation of said limit displayed relative to the plural channel information.

7. The multiple channel data display device according to claim 5, wherein said plural channel information display elements comprise plural columns of indicators representing a relative signal value on each of the plurality of fiber optic channels and wherein said detail information further comprises a polarity indicator.

8. The multiple channel data display device according to claim 5, wherein the threshold indicator comprises a line.

9. A method for displaying multiple fiber optic channel data in an optical network test instrument configured to perform a plurality of measurements, the method comprising:
   Presenting on a display plural channel information on characteristics of a plurality of fiber optic channels corresponding to a plurality of optical fibers simultaneously in a graphical form, the presented plural channel information corresponding to a particular measurement being performed across the plurality of fiber optic channels corresponding to the plurality of optical fibers;
   presenting on the display a threshold indicator in relation to the presented plural channel information, wherein the threshold indicator comprises a graphical representation of a limit corresponding to the particular measurement being performed across the plurality of fiber optic channels; and
   simultaneously presenting on the display further detail information for at least one fiber optic channel among the plurality of fiber optic channels, wherein said detail information is selected based on the particular measurement being performed, said detail information comprising at least a measurement type indicator and mode indicator.

* * * * *